United States Patent
Towle

[11] Patent Number: 5,145,938
[45] Date of Patent: Sep. 8, 1992

[54] PREPARATION OF POLY(ARYLENE ETHER KETONES)

[75] Inventor: Ian D. H. Towle, Stratton, United Kingdom

[73] Assignee: Raychem Limited, London, England

[21] Appl. No.: 476,373

[22] PCT Filed: Nov. 17, 1988

[86] PCT No.: PCT/GB88/01012
§ 371 Date: Jun. 29, 1990
§ 102(e) Date: Jun. 29, 1990

[87] PCT Pub. No.: WO89/04848
PCT Pub. Date: Jun. 1, 1989

[30] Foreign Application Priority Data
Nov. 17, 1987 [GB] United Kingdom ............ 8726884

[51] Int. Cl.$^5$ .................. C08G 8/02; C08G 14/00
[52] U.S. Cl. .................. 528/125; 528/126; 528/128; 528/219; 528/220
[58] Field of Search .......... 528/125, 126, 128, 219, 528/220

[56] References Cited

U.S. PATENT DOCUMENTS

| | | | |
|---|---|---|---|
| 3,441,538 | 4/1969 | Marks | 528/86 |
| 3,442,857 | 5/1969 | Thornton | 528/86 |
| 4,396,755 | 8/1983 | Rose | 528/126 |
| 4,826,947 | 5/1989 | Jansons et al. | 528/125 |
| 4,870,153 | 9/1989 | Matzner et al. | 528/125 |
| 4,942,216 | 7/1990 | Heinz et al. | 528/125 |
| 4,990,589 | 2/1991 | Towle et al. | 528/125 |
| 5,081,216 | 1/1992 | Koch et al. | 528/125 |

FOREIGN PATENT DOCUMENTS

| | | |
|---|---|---|
| 0063874A1 | 11/1981 | European Pat. Off. . |
| 0087532A2 | 9/1983 | European Pat. Off. . |
| 0124276A2 | 11/1984 | European Pat. Off. . |
| 0174207A2 | 3/1986 | European Pat. Off. . |
| 0178871A2 | 4/1986 | European Pat. Off. . |
| WO84/03891 | 10/1984 | PCT Int'l Appl. . |
| WO84/03892 | 10/1984 | PCT Int'l Appl. . |
| WO86/04542 | 8/1986 | PCT Int'l Appl. . |
| WO86/07598 | 12/1986 | PCT Int'l Appl. . |
| 1102679 | 2/1968 | United Kingdom . |
| 2172294A | 9/1986 | United Kingdom . |
| 2179951B | 3/1987 | United Kingdom . |
| 2138433A | 10/1987 | United Kingdom . |

Primary Examiner—John Kight, III
Assistant Examiner—P. Hampton-Hightower
Attorney, Agent, or Firm—Yuan Chao; Herb Burkard

[57] ABSTRACT

An arylene ether ketone copolymer comprising:
(a) 99 to 10 mol % of repeat units

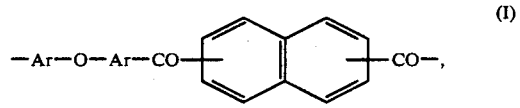

and
(b) 1 to 90 mol % of repeat units —Ar—O—Ar—CO— (II), wherein each Ar independently is m- or p-phenylene or a di- or poly- m- and/or p-phenylene moiety in which the phenylene rings are linked together by direct bonds or by —O— or —CO— groups.

Especially preferred are the copolymers wherein (I) is

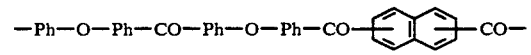

and (II) is —Ph—O—Ph—CO—Ph—O—Ph—CO—Ph—CO—, each Ph independently being m- or p-phenylene.

10 Claims, No Drawings

PREPARATION OF POLY(ARYLENE ETHER KETONES)

This invention relates to novel poly(arylene ketones) and to a process for preparing such polymers.

Poly(arylene ether ketones), in particular all para-linked poly(arylene ether ketones), possess many desirable properties, for example, high temperature stability, mechanical strength, and resistance towards common solvents. The preparation of poly(arylene ether ketones) by two different approaches has been described in the literature. The first approach is an electrophilic synthesis in which an aryl ketone linkage is formed. The second is a nucleophilic synthesis in which an aryl ether linkage is formed. The electrophilic synthesis is preferred for preparing the novel poly(arylene ether ketones) of this invention, and the following remarks may aid understanding of the description of the novel polymers.

In such an electrophilic synthesis, the polymerization step involves the formation of an aryl ketone group from a carboxylic acid halide, acid, or other acid derivative group (hereinafter all referred to as acid derivatives) and an aromatic compound containing an aromatic carbon bearing an activated hydrogen atom, i.e., a hydrogen atom displaceable under the electrophilic reaction conditions. The monomer system employed in the polymerisation can be, for example, (a) a single aromatic compound containing both the acid derivative group and an activated hydrogen atom on an aromatic carbon for example, p-phenoxybenzoyl chloride; or (b) a two-component system of a dicarboxylic acid or acid derivative and an aromatic compound containing two activated hydrogen atoms, for example, 1,4-diphenoxybenzene and terephthaloyl chloride.

Electrophilic polymerisation of this type is often referred to as Friedel-Crafts polymerisation. Typically, such polymerisations are carried out in a reaction medium comprising the reactant(s), a Lewis acid catalyst, such as anhydrous aluminum trichloride, and solvent such as methylene chloride, carbon disulfide, nitromethane, nitrobenzene, or orthodichlorobenzene. Because the carbonyl groups of the reactant(s) and products complex with aluminum trichloride and thereby deactivate it, the aluminium trichloride catalyst is generally employed in an amount greater than one equivalent for each equivalent of carbonyl groups in the reaction medium. Other inorganic halides such as ferric chloride, may be employed as the catalyst.

Such Friedel-Crafts polymerisations generally have produced an intractable reaction product difficult to remove from the reaction vessel and purify. Further, such processes have tended to produce polymer of undesirably low molecular weight and/or of poor thermal stability. The all para-linked poly(arylene ether ketones) have been particularly difficult to prepare under such Friedel-Crafts conditions. One factor that appears to contribute to the unsatisfactory results reported in the literature is that the para-linked polymers are more highly crystalline than the ortho, meta or mixed isomeric members of this polymer family and are therefore generally more insoluble in the reaction media typically used in such Friedel-Crafts reactions. This tends to result in the premature precipitation of the polymer in low molecular weight form. Another factor that may lead to these poor results is alkylation of the terminal group which prevents further growth of the polymer chain. Also, side reactions, particularly at the ortho position of activated aromatic rings can result in a polymer that is branched and/or is more likely to cross-link at elevated temperatures such as those required for melt processing the polymer. It is generally recognized that in Friedel-Crafts reactions, ortho substitution of the polymer is more likely to occur if the reaction is conducted at elevated temperatures and/or for a relatively long reaction time. U.S. Pat. No. 3,065,205 to Bonner, U.S. Pat. Nos. 3,767,620 to Angelo et al, 3,516,966 to Berr, 3,791,890 to Gander et al, 4,008,203 to Jones and U.K. Patents No. 971,227 and 1,086,021 both to Imperial Chemical Industries, Limited, disclose the preparation of poly(arylene ketones) by Friedel-Crafts polymerisation and generally acknowledge some of the difficulties in producing tractable, meltstable polymers. For example, Gander et al provide a method of producing the polymers in granular form by special treatment of the reaction mixture, and Angelo et al provide the method of treating the polymer to reduce undesired end groups which result from side reactions during polymerisation and which cause thermal instability of the polymer.

To overcome the disadvantages encountered in producing poly(arylene ketones) by the above described Friedel-Crafts polymerisation, it has been proposed to use boron trifluoride catalyst in anhydrous hydrogen fluoride, as described, for example, in U.S. Pat. Nos. 3,441,538 to Marks, 3,442,857 to Thornton, 3,953,400 to Dahl, and 3,956,240 to Dahl et al. This general process has been used commercially to produce polymer of the desired high molecular weight and thermal stability. However, the use of boron trifluoride and hydrogen fluoride requires special techniques and equipment making this process difficult to practice on a commercial scale.

Published European Patent Application 0124276, the disclosure of which is incorporated herein by reference, describes an improved method for the production of poly(arylene ether ketones) by an electrophilic synthesis which results in high molecular weight, thermally stable polymers using reaction media that are readily handled on a commercial scale.

In one aspect of that improved method, the Lewis acid catalysis is controlled by means of a Lewis base controlling agent to provide a high reaction rate which enables the reaction to be carried out at relatively low temperatures over a relatively short period of time, while the polymer produced is essentially linear with little, if any, ortho substitution of the aromatic rings in the polymer backbone. Further, the polymer is maintained in the reaction medium, for example in solution or in a reactive gel state, until high molecular weight polymer is obtained, and recovery and purification of the polymer is thereby greatly facilitated.

The polymers produced by that process have repeat units of the general formula

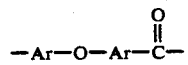

wherein each Ar, as defined in the disclosure of that process, is independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. In certain of the monomers, e.g. the polynuclear aromatic monomers, the acid halide monomers and certain diacid dihalides, at least two of the aromatic rings are linked by an ether oxygen linkage. Other linking groups which can join aromatic rings in the aromatic moieties include, for example, carbonyl, sulfone, sulfide, ester, amide, imide, azo, alkylene, fluoroalkylene and the like.

The phenylene and polynuclear aromatic moieties can contain substitutents on the aromatic rings. These substituents should not inhibit or otherwise interfere with the polymerisation reaction to any significant extent. Such acceptable substituents include, for example, phenyl, halogen, nitro, cyano, alkyl, 2-aralkyl, haloalkyl and the like.

While thermoplastic polymers made by that method may meet very high engineering performance requirements, some of those described have melt viscosities and/or crystalline melting temperatures which are inconveniently high for some purposes, for example for melt-consolidation of high performance fibre/polymer composites. The present invention provides novel copolymer and homopolymers which tend to be less inconvenient in this respect.

This invention accordingly provides an arylene ether ketone copolymer comprising:

(a) 99 to 10 mol % of repeat units

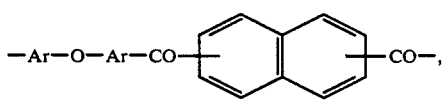

and (b) 1 to 90 mol % of repeat units —Ar—O—Ar—CO— (II), wherein each Ar independently is m- or p-phenylene or a di- or poly- m- and/or p-phenylene moiety in which the phenylene rings are linked together by direct bonds or by —O— or —CO— groups.

The copolymers are preferably prepared by the aforementioned improved method of European Patent Application 0124276, using a Lewis base controller for the Lewis acid catalyst, but other methods e.g. nucleophilic may be used if acceptable products can be achieved.

The copolymers of most interest comprise 90 to 10 mol %, preferably 50 to 10 mol %, of (I) and 10 to 90 mol %, preferably 50 to 90 mol % of (II), especially useful copolymers within those ranges being those comprising 40 to 20 mol %, preferably 35 to 25 mol %, of (I) and 60 to 80 mol %, preferably 65 to 75 mol % of (II).

A preferred class of such copolymers comprises those in which each Ar independently is p-phenylene or a said di- or poly-p-phenylene moiety and the naphthyl moiety in (I) is attached to the carbonyl groups at the 2,6- positions. Other isomeric configurations may be used if desired, provided the performance of the resulting copolymer remains satisfactory.

For example, a copolymer wherein (I) is

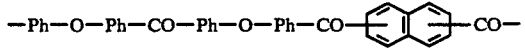

and (II) is —Ph—O—Ph—CO—Ph—O—Ph—CO—Ph—CO—, each Ph independently being m- or p-phenylene may conveniently be produced by reacting the monomer 4,4'-diphenoxybenzophenone with an equimolar amount of a mixture of the desired isomers of the diacid halides of benzene and naphtalene. The molar proportions of the benzene and naphthalene diacid halides will be chosen according to the mol % of each desired in the resulting copolymer. This copolymer has the advantage of approximately the same glass transition temperature (Tg) as the homopolymer of (II) alone, but has a much lower crystalline melting point (Tm), e.g. about 350° C. for 35% naphthalene diacid halide content compared with 385° C. for the homopolymer.

Another kind of copolymer, wherein

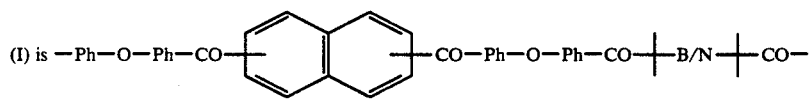

and

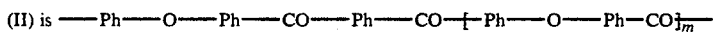

wherein m is 0 or 1, the B/N structure is a benzene or naphthalene ring moiety, and each Ph independently is m- or p-phenylene can be produced from a new monomer of formula

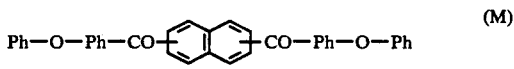

wherein each Ph independently is m- or p-phenylene together with either diphenyl ether (when m is O) or 4,4'-diphenoxybenzophenone (when m is 1) and an appropriate diacid halide of naphthalene or benzene, depending upon which, or what mixture, of these is desired for the B/N moiety.

The invention also provides a homopolymer of inherent viscosity greater than 0.6 preferably greater than 0.8, more preferably greater than 1.0 dl/g (0.1% solution in concentrated sulphuric acid) having the repeat unit (I) as shown above wherein each Ar independently is p-phenylene or a poly-p-phenylene moiety in which the p-phenylene rings are linked together by direct bonds or by —O— or —CO— groups, substantially free from m- and o- branching of the polymer backbone chain.

Preferred homopolymers are those having the repeat unit

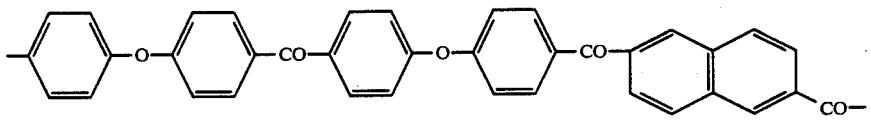

and those having the repeat unit

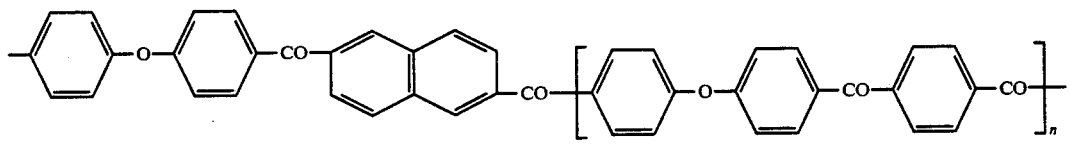

wherein n is 0 or 1.

It is preferred to prepare the novel polymers (homo- or co-polymers) according to this invention by a method wherein either the moiety

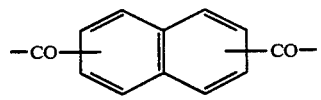

is provided by using the corresponding diacid halide as one of the monomers in the aforementioned improved polymerisation reaction, or the moiety

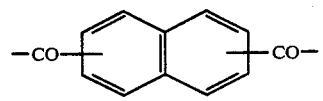

is provided by using the appropriate isomeric form of a compound of formula

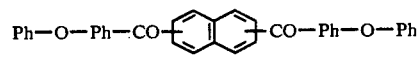 (M)

wherein each ph independently is m- or p-phenylene, as one of the monomers in the improved polymerisation reaction with one or more aryl diacid halides. Preferably, the polymerisation will be carried out in accordance with the aforementioned improved method in the presence of a Lewis base moderator for the Lewis acid catalyst.

The novel intermediate compounds (M) are themselves part of the invention, a preferred compound (M) being that in which each ph is p-phenylene and the naphthyl moiety is attached at the 2,6-positions. These novel compounds may be prepared by reacting a diacid halide of formula

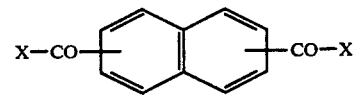

wherein X is halogen, with diphenyl ether under Friedel-Crafts conditions, and it has been found preferable to omit any Lewis base controller for this monomer preparation.

The term "Lewis acid" is used herein to refer to a substance which can accept an unshared electron pair from another molecule. Lewis acids which can be used in preparing the polymers and novel monomers of this invention include, for example, aluminium trichloride, aluminium tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. The use of substantially anhydrous aluminium trichloride as the Lewis acid is preferred.

The amount of Lewis acid used varies depending on the particular monomers and reaction medium selected. The amount of Lewis acid used is preferably at least about one equivalent of Lewis acid per equivalent of carbonyl groups present in the monomer, one equivalent per equivalent of Lewis base present in the reaction medium plus an amount effective to act as a catalyst for the polymerisation (also referred to herein as a catalytic amount). When aluminium chloride is used as the Lewis acid one equivalent is considered to be $AlCl_3$. Generally a catalytic amount added is from about 0.05 to about 0.3 equivalents of Lewis acid per equivalent of acid halide in the reaction mixture. Further, if as comonomer containing other basic species, such as sulfone groups, is used, additional Lewis acid may be required.

The preferred addition of a Lewis Base controlling agent to the improved Friedel-Crafts polymerisation, inter alia, suppresses undesirable side reactions, particularly ortho substitution of activated aryloxy groups. Suppression of side reactions results in a polymer that is thermally stable, that is it does not degrade or cross-link when subjected to elevated temperatures, e.g. temperatures above the melting point of the polymer, for a period of time. For a polymer of this type to be suitable for melt processing, it must be able to withstand the processing temperatures for the required processing time. Typically these conditions require that the polymer can withstand temperatures up to about 30° C. above the melting or softening point of the polymer for periods of at least 30 minutes, preferably at least 60 minutes and most preferably at least 90 minutes, without undesired gel formation or substantial change in inherent viscosity.

The term "Lewis base" is used herein to refer to a substance capable of donating an unshared electron pair to a Lewis acid. Thus, the Lewis base forms a complex with the Lewis acid used in the reaction medium. It has been found that Lewis bases which form a 1:1 complex having a heat of association at least about that of diphenyl ether with the Lewis acid are preferred. For example, where aluminim trichloride is the Lewis acid, the Lewis base used should form a 1:1 complex having a heat of association of at least about 63 kJ (15 kcal)/mole, preferably at least about 83.5 kJ (20 kcal)/mole and most preferably at least about 125 kJ (30 kcal)/mole. While the heats of association are for a 1:1 Lewis acid/Lewis base complex consisting solely of these two components, the actual complex formed in the reaction medium need not be a 1:1 complex. A discussion on heats of association for Lewis acid/Lewis base complex is found in J. Chem Soc. (A), 1971, pages 3132–3135 (D. E. H. Jones et al). The Lewis base used should not be an acylating, alkylating or arylating agent nor should it be acylatable under the reaction conditions. However, the protic Lewis bases described in copending European patent application No. 87308245.7 the disclosure of which is incorporated herein by reference, may also be used.

Mixtures of two or more Lewis bases can be used if desired. The Lewis base used as a controlling agent in the practice of this invention is an additional component added to the reaction medium. This does not include basic species formed in situ during the polymerisation.

Typical Lewis bases which can be employed include, for example, amides, amines, esters, ethers, ketones, nitriles, nitro compounds, phosphines, phosphine oxides, phosphoramides, sulfides, sulfones, sulfonamides, sulfoxides, halide salts, benzoic acid, acetic acid, linear aliphatic alcohols. Examples of specific organic Lewis bases that can be used are described in the aforementioned European Patent Application 0124276.

Specific examples of the preparation of the novel copolymers, homopolymers, and monomers of this invention will now be described to illustrate the invention in more detail.

EXAMPLE 1

To a 1 liter jacketed reaction vessel, equipped with stirrer, and having been purged with dry nitrogen was added 200 mls of dichloromethane. After cooling to −25° C., 156.65 g (1.175M) of anhydrous aluminium chloride was added. After allowing the slurry to cool back to −25° C., 38.33 g (0.407M) of dimethyl sulphone was added at a rate such that the temperature of the reactants did not rise above −15° C. After allowing the mixture to cool to −20° C., 73.284 g (0.2M) of 4,4'-diphenoxybenzophenone was added, again maintaining the temperature of the reagents at or below −15° C. Residual monomer was rinsed into the reaction vessel with 40 mls of fresh dichloromethane. Also at −20° C. was added a mixture of 26.8677 g (0.1323M) of terephthaloyl chloride and 18.0345 g (0.07126M) of 2,6-naphthalene dicarboxylic acid chloride. Again residual acid chloride was rinsed into the reaction vessel with 50 mls of fresh dichloromethane. Lastly 1.8578 g (0.0072M) of 4-phenoxybenzophenone end capper was added and rinsed with 10 mls of fresh dichloromethane. The temperature of the reagents was then increased to +10° C. over 25 minutes and maintained for 60 minutes to allow the reactants to dissolve and partially react. The temperature was then increased to +20° C. over 30 minutes and maintained for the duration of the reaction, which is typically 6 to 10 hours at +20° C.

The complexed polymer gel was decomplexed by breaking it up in a high speed blender in ice/water. After blending the polymer was filtered off as a white fibrous solid. The solid was transferred to a 2 liter flask containing 1 liter of 80% aqueous methanol and the slurry stirred overnight. After filtering and reslurrying in fresh 20% aqueous methanol the whole was heated to boiling and residual dichloromethane removed. The polymer fluff was boiled up a further two times in fresh methanol/water (1:4). The polymer fluff was dried first at 100° C. overnight and then at 250° C. for a further eight hours.

The resultant polymer had an inherent viscosity of 1.00 dl/g, as measured as a 0.1% solution in concentrated sulphuric acid. The Tg of the polymer was 177° C. and Tm 355° C.

The structure of the co-polymer was confirmed by $^1$H and $^{13}$C N.M.R. spectroscopy as containing the repeat units (Ph=p-phenylene)

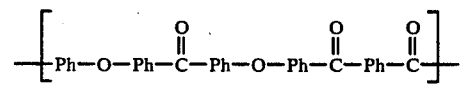

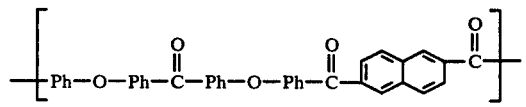

EXAMPLES 2–8

Following the procedure outlined in Example 1 co-polymers were prepared from 4,4'-diphenoxybenzophenone, terephthaloyl chloride and 2,6-naphthalenedicarboxylic acid chloride where the ratio of terephthaloyl chloride to 2,6-naphthalenedicarboxylic acid chloride were changed. The results are shown in the table below.

| Example | TPC: 2,6-NDAC | Tg °C. | Tm °C. | I.V. dl/g |
|---|---|---|---|---|
| 2 | 100:00 | 170° C. | 380 | 1.10 |
| 3 | 80:20 | 169° C. | 370 | 0.93 |
| 4 | 75:25 | 170° C. | 353 | 0.97 |
| 5 | 70:30 | 169° C. | 353 | 1.17 |
| 6 | 65:35 | 171° C. | 346 | 1.00 |
| 7 | 60:40 | 170° C. | 350 | 0.89 |
| 8 | 0:100 | 170° C. | 397 | 0.88 |

EXAMPLE 9

Following the procedure outlined in Example 1 a co-polymer of I.V. 1.88 dl/g having a Tg of 173° C. and Tm of 355° C. was prepared using the reagents specified below.

| | | |
|---|---|---|
| 4,4-Diphenoxybenzophenone | 5.6313 g | 0.01537M |
| 2,6-Bis(4-phenoxybenzoyl) naphthalene | 2 g | 3.8421 × 10$^{-3}$M |
| Terephthaloyl chloride | 3.9004 g | 0.01921M |
| Dimethyl sulphone | 5.64 g | 0.06M |
| Aluminium trichloride | 19.747 g | 0.1481M |
| Dichloromethane | 100 mls | |

The structure of the co-polymer was confirmed by $^1$H and $^{13}$C N.M.R. spectroscopy as containing the repeat units (Ph=p-phenylene)

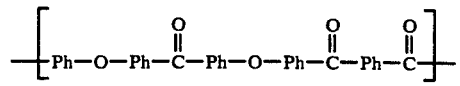

-continued

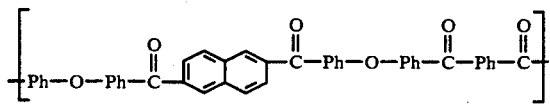

A similar material of I.V. 2.00 dl/g was prepared where the dimethyl sulphone was replaced with 4.44 g (0.06M) of n-butanol.

EXAMPLE 10—MONOMER PREPARATION

To a 1 liter flask equipped with a stirrer and gas inlet/outlet was added 250 mls of dichloromethane which was then cooled to −25° C. To the cold solvent was added 66.67 g (0.5M) of aluminum chloride. To this cold slurry, at −25° C., was slowly added 200 g (1.175M) of diphenyl ether, keeping the temperature in the vessel below −10° C. After cooling the flask contents back to −25° C., 50 g (0.1970 M) of 2,6-naphthalene dicarboxylic acid chloride was added to the reaction mixture and residual acid chloride rinsed into the flask with 50 mls of fresh dichloromethane. The reaction mixture was then allowed to warm to +22° C. and maintained for 6 hours. The orange/yellow suspension was decomplexed by pouring the whole onto 1.5 kgs of ice. After filtering the white solid was washed with deionised water and dried overnight at 120° C. The crude product was crystallised from toluene (2.2 liters) to give 90 g of a pure white crystalline product (88%).

The purity of this material as determined by D.S.C. was 99.67M % m.p. 214° C.

EXAMPLE 11

Following the procedure outlined in Example 1 a homo-polymer of I.V. 1.83 dl/g having a Tg of 188° C. and Tm of 390° C. was prepared using the reagents specified below.

| 2,6-Bis(4-phenoxybenzoyl) naphthalene | 3 g | 5.7631 × 10⁻³M |
| --- | --- | --- |
| Terephthaloyl chloride | 1.1700 g | 5.76311 × 10⁻³M |
| Dimethyl sulphone | 2.167 g | 0.023M |
| Aluminium trichloride | 7.37 g | 0.055M |
| Dichloromethane | 50 mls | |

The structure of the homopolymer was confirmed by $^1$H and $^{13}$C N.M.R. spectroscopy as containing the reapeat unit (Ph=p-phenylene)

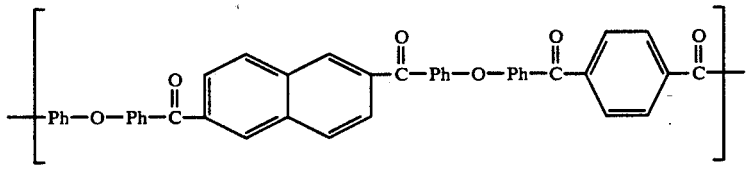

EXAMPLE 12

Following the procedure outlined in Example 1 a homo-polymer of I.V. 1.90 dl/g having a Tg of 209° C. and Tm of 395° C. was prepared using the reagents specified below.

| 2,6-Bis(4-phenoxybenzoyl) naphthalene | 5 g | 9.6052 × 10⁻³M |
| --- | --- | --- |
| 2,6-Naphthalenedicarboxylic acid chloride | 2.3879 g | 9.4354 × 10⁻³M |
| Dimethylacetamide | 3.34 g | 0.0384M |
| Alumnium trichloride | 12.24 g | 0.0918M |
| Dichloromethane | 50 mls | |

The structure of the homo-polymer was confirmed by $^1$H and $^{13}$C N.M.R. spectroscopy as containing the repeat unit (Ph=p-phenylene)

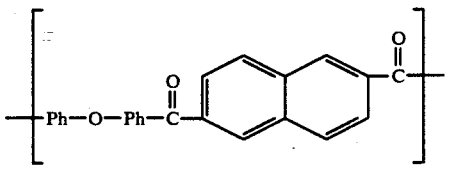

We claim:
1. An arylene ether ketone copolymer comprising
   (a) 99 to 10 mol % of repeat units selected from the group consisting of

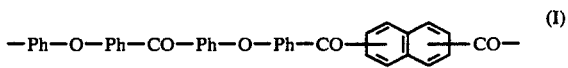 (I)

and

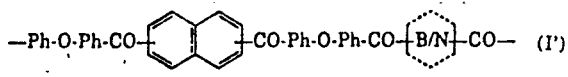 (I')

and
   (b) 1 to 90 mol % of repeat units selected from the group consisting of

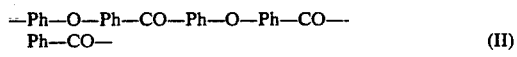 (II)

and

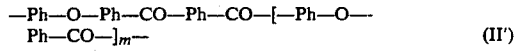 (II')

wherein m is 0 or 1, the B/N structure is a benzene or naphthalene ring moiety, and each Ph independently is m- or p-phenylene; provided that when the repeat unit (a) is (I), then the repeat unit (b) is (II) and that when the repeat unit (a) is (I'), then the repeat unit (b) is (II').

2. A copolymer according to claim 1, wherein repeat unit (a) is (I) and repeat unit (b) is (II).

3. A copolymer according to claim 1, wherein repeat unit (a) is (I') and repeat unit (b) is (II').

4. A copolymer according to claim 2 or 3, comprising 90 to 10 mol % of repeat units (a) and 10 to 90 mol % of repeat units (b).

5. A copolymer according to claim 2 or 3, comprising 50 to 10 mol % repeat units (a) and 50 to 90 mol % of repeat units (b).

6. A copolymer according to claim 2 or 3, comprising 40 to 20 mol % of repeat units (a) and 60 to 80 mol % of repeat units (b).

7. A copolymer according to claim 2 or 3, comprising 35 to 25 mol % of repeat units (a) and 65 to 75 mole % of repeat units (b).
8. A copolymer according to claim 2 or 3, wherein m is 0 and the B/N structure represents a benzene ring.
9. A copolymer according to claim 2 or 3, wherein each Ph is p-phenylene.
10. A copolymer according to claim 3, wherein the moiety represented as
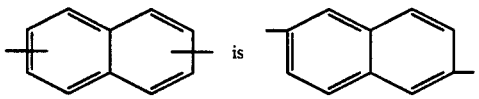
* * * * *